United States Patent [19]

Wilson et al.

[11] Patent Number: 4,684,504
[45] Date of Patent: Aug. 4, 1987

[54] BOW RESISTANT STRUCTURAL MEMBER FOR FUEL ASSEMBLIES IN NON-CONTROL ROD LOCATIONS OF A NUCLEAR REACTOR CORE

[75] Inventors: John F. Wilson, Murrysville Boro; Robert K. Gjertsen, Monroeville; Harry M. Ferrari, Edgewood Boro, all of Pa.

[73] Assignee: Westinghouse Electric Corp., Pittsburgh, Pa.

[21] Appl. No.: 748,855

[22] Filed: Jun. 26, 1985

[51] Int. Cl.⁴ .............................................. G21C 3/32
[52] U.S. Cl. .................................... 376/447; 376/445
[58] Field of Search ............... 376/447, 327, 220, 333, 376/209, 445

[56] References Cited

U.S. PATENT DOCUMENTS

| | | | |
|---|---|---|---|
| 3,230,152 | 1/1966 | Icerze | 376/420 |
| 3,679,545 | 7/1972 | Leirvik | 376/420 |
| 4,131,511 | 12/1978 | Mordarski | 376/420 |
| 4,432,934 | 2/1984 | Gjertsen | 376/220 |

Primary Examiner—Donald P. Walsh

[57] ABSTRACT

A fuel assembly for use at non-control rod locations of a nuclear reactor core includes top and bottom nozzles and longitudinal structural members extending between and attached to the nozzles for forming an integral unitary structure. One or more of the structural members includes an elongated hollow cladding tube extending between the top and bottom nozzles and end plugs secured to opposite ends of the tube for hermetically sealing and attaching the tube to the top and bottom nozzles. The improvements in the structural member relate to features for reducing fuel assembly bow. Such features relate to a quantity of thermal or irradiation-induced creep resistant material and pretensioning means positioned within the tube. The creep resistant material is a ceramic material in stacked pellet form and coated with a burnable adsorber material. The pretensioning means applies a predetermined compressive load to the ceramic pellet stack and reacts the load so as to preload the tube in a state of pretension having a magnitude sufficient to substantially counteract an axial load typically transmitted through the unitary structure of the fuel assembly and thereby greatly reduce the compressive stress in the structural member tube. There are two embodiments of the pretensioning means. In one embodiment, it is an elongated bellows type device positioned within the tube between the ceramic pellet stack and one of the tube ends, with the interior of the bellows type device being pressurized to create a predetermined axial force therein which places the ceramic pellet stack in compression and the tube in the state of pretension. In the other embodiment, it is an arrangement of belleville springs positioned within the tube between the ceramic pellet stack and one of the tube ends and stacked both in series and in parallel.

13 Claims, 4 Drawing Figures

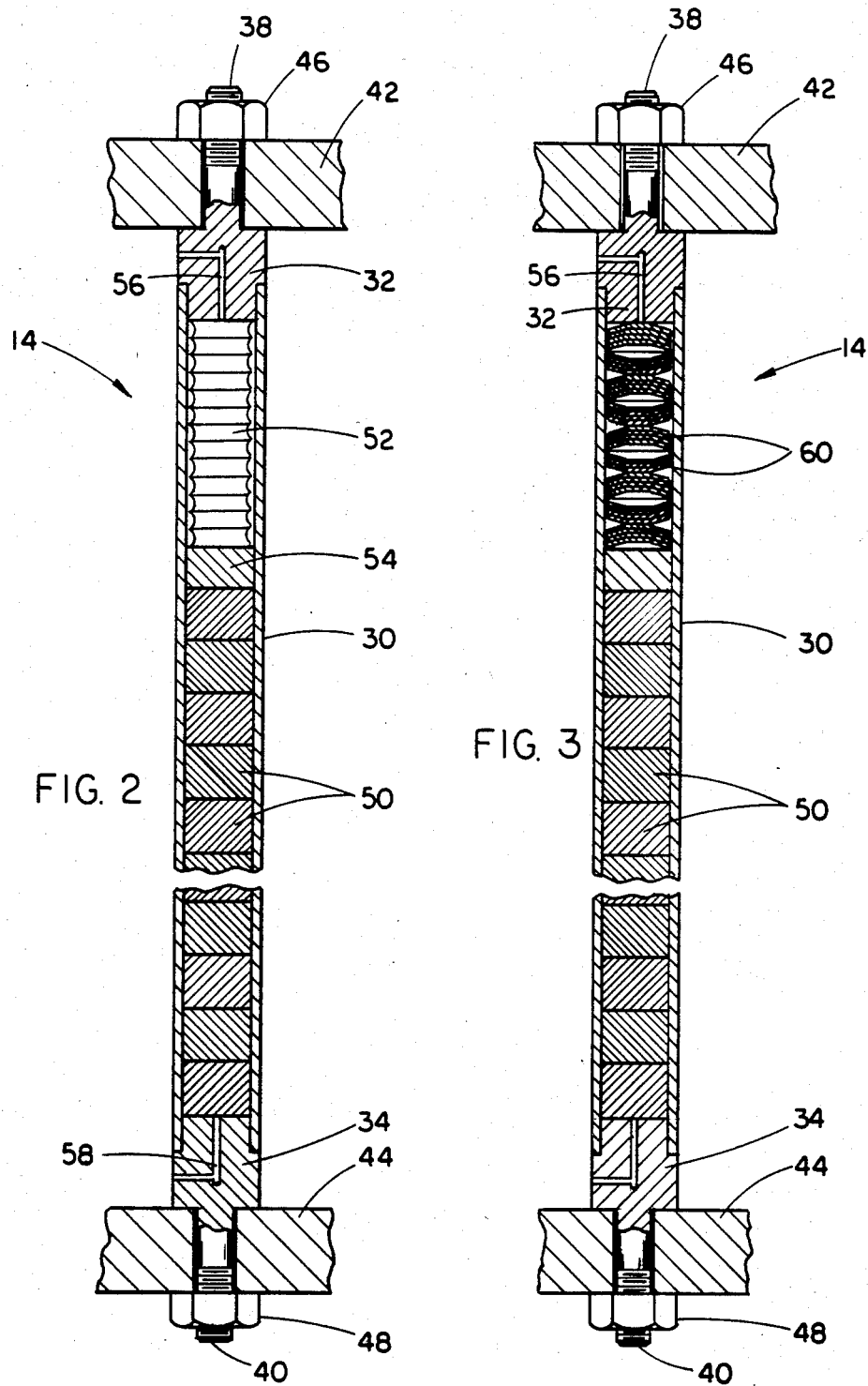

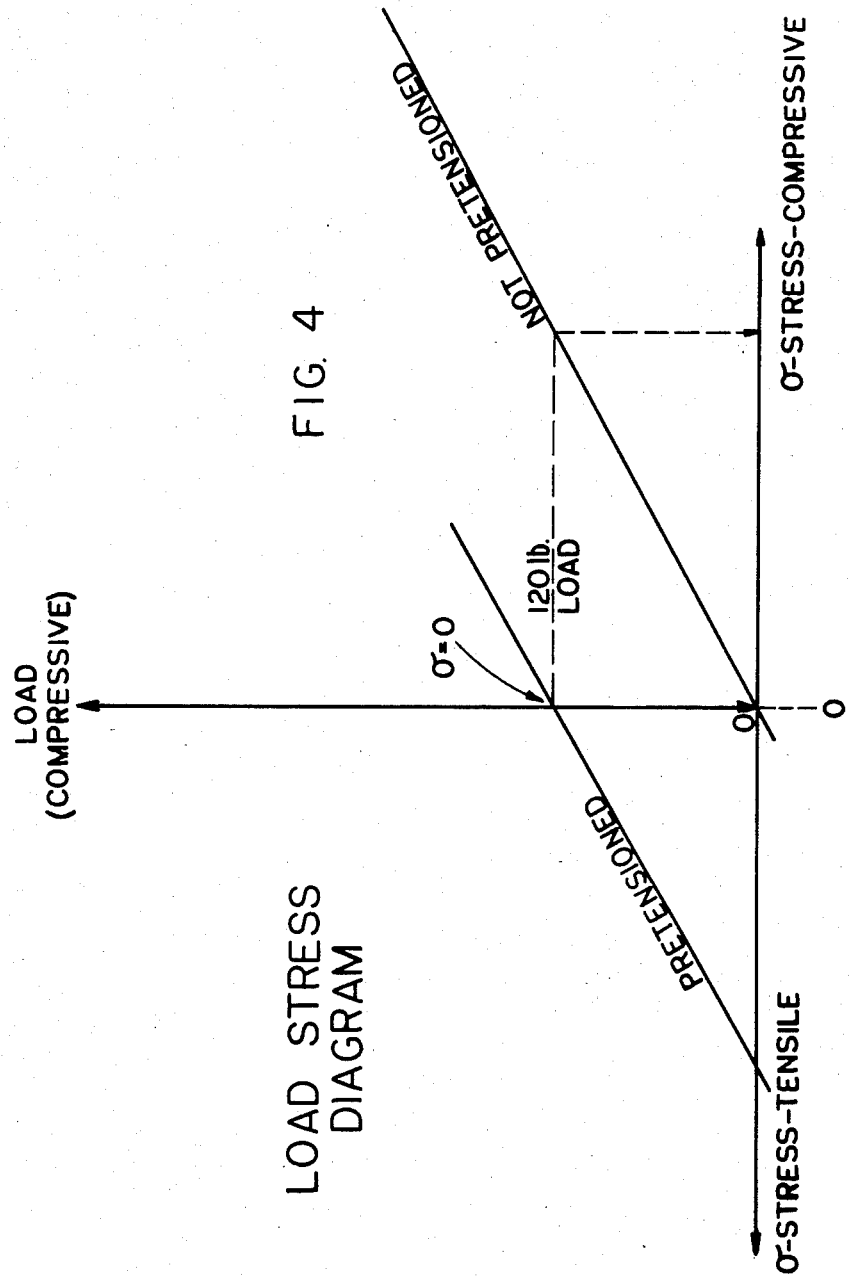

BOW RESISTANT STRUCTURAL MEMBER FOR FUEL ASSEMBLIES IN NON-CONTROL ROD LOCATIONS OF A NUCLEAR REACTOR CORE

CROSS REFERENCE TO RELATED APPLICATION

Reference is hereby made to the following copending application dealing with related subject matter and assigned to the assignee of the present invention: "Nuclear Reactor" by Harry M. Ferrari et al, assigned U.S. Ser. No. 732,220 and filed May 9, 1985.

BACKGROUND OF THE INVENTION

1. Field of the Invention

The present invention relates generally to fuel assemblies for nuclear reactors and, more particularly, is concerned with a bow resistant fuel assembly structure for non-control rod locations of the reactor core.

2. Description of the Prior Art

The cores of nuclear reactors conventionally include a plurality of fuel assemblies. In a typical pressurized water nuclear reactor (PWR), all fuel assemblies are geometrically alike. Each fuel assembly includes a multiplicity of fuel rods held in an organized array by grids spaced along the fuel assembly length. The grids are attached to a plurality of control rod guide thimbles. Top and bottom nozzles of the fuel assembly are secured to opposite ends of the control rod guide thimbles which extend above and below the opposite ends of the fuel rods. The guide thimbles together with the top and bottom nozzles rigidly attached thereto compose the structural skeleton of the fuel assembly.

To control the fission process created by nuclear fuel contained in the fuel rods, typically a number of control rods are reciprocally positioned for movement in the guide thimbles of the fuel assembly. However, not all of the fuel assembly locations of a reactor core use control rods. Only about one-third of the fuel assemblies are in control rod locations. But since heretofore all PWR fuel assemblies have been constructed to be alike geometrically, this means that the fuel assemblies for control rod locations have been the same as those for non-control rod locations.

A departure from this prior practice of constructing all PWR fuel assemblies alike has been proposed recently. As described and illustrated in the patent application cross-referenced above, a separate fuel assembly design for non-control rod locations includes a bottom nozzle, a number of longitudinally extending structural members which contain a burnable poison and a top nozzle. It also includes a number of grids which are axially spaced and attached to the longitudinal structural members and support an array of fuel rods. The top and bottom nozzles are attached to the longitudinal structural members by screw thread connections or other suitable rigid attaching means. An instrumentation tube is located in the center of the assembly and is supported by the top and bottom nozzles and by the grids.

One important difference in this non-control rod fuel assembly over the conventional control rod fuel assembly lies in the design of the longitudinal structural members which interconnect the top and bottom nozzles to form the structural skeleton of the assembly. In the conventional PWR assembly, the structural members are the hollow guide thimble tubes which are open at the top and closed at the bottom (except for small holes for coolant flow). These tubes are positioned within the fuel assembly to align with the control rods. During reactor operation, the control rods move reciprocally in the tubes. On the other hand, in the non-control rod fuel assembly intended for use in non-control rod core locations, the structural member also in the form of tubes do not receive control rods. Therefore, different functional as well as structural use can be made of the tubes.

Functionally, this non-control rod structural member contains burnable absorber material. Burnable absorbers, such as a suitable compound of boron, are used in modern reactors to provide an additional means for controlling reactivity especially at the beginning of life of the nuclear fuel. Structurally, the elongated tube of the structural member is closed at each end by end plugs which are welded to the tube. The tube and end plug material is preferably Zircaloy-4. A spring holds the absorber material in place in the tube and provides a plenum for accumulation of helium gas which is released when a neutron interacts with a boron atom. To assemble the non-control rod structural members into the fuel assembly, the tubes must be empty and open at one end. After the grids are bulge fitted to the tubes, the absorber material and spring are loaded into the tubes and the remaining one end plugs welded in place. The fuel rods are then loaded and the top and bottom nozzles are bolted on.

In the non-control rod fuel assembly, there are eight absorber structural members whereas the conventional control rod fuel assembly has twenty-four guide thimbles. Thus, there are sixteen more fuel rods per non-control rod fuel assembly which has the benefits described in the above cross-referenced application.

The use of non-control rod fuel assemblies in PWRs having the design described above has created an opportunity to possibly overcome an important problem which has been present for a long time and affects the overall performance of PWR fuel assemblies: fuel assembly bow. There appears to be a definite relationship between the magnitude of fuel assembly bow and compressive stresses in the guide thimbles. Unfortunately, there is no readily apparent method of appreciably reducing the compressive stresses in the guide thimbles of control rod fuel assemblies which are in control rod core locations. However, for fuel assemblies in non-control rod core locations and designed as described above, an opportunity would appear to exist to find a way of greatly reducing the compressive stresses in the longitudinal structural members.

SUMMARY OF THE INVENTION

The present invention provides an improved longitudinal structural member for the non-control rod fuel assembly designed to satisfy the aforementioned needs. In the non-control rod fuel assembly described above and more completely disclosed in the cross-referenced patent application, axial force from the top nozle holddown spring is transmitted from the top nozzle adapter plate to the top end plug of the longitudinal structural member, through its cladding tube to the bottom end plug and then to the bottom nozzle adapter plate. The cladding tube is thus placed in a state of compression which will result in permanent fuel assembly bow.

The present invention improves the design of the longitudinal structural member so as to greatly reduce or counteract the deleterious effects of compressive stresses on its cladding tube. Basically, the solution involves preloading the cladding tube of the structural member in tension. Preloading the tube of a free standing structure of this type in tension means that the central part of it must be loaded in compression. Also, the material loaded in compression must not be subject to thermal or irradiation induced creep or the structure will creep to a permanently bowed position. Thus, the center portion must be made of a creep resistant material. Ceramic materials which are very creep resistant can be used. Therefore, the improvement of the present invention envisions a unique arrangement for applying a compressive load on the ceramic material, such preferably being in a stacked pellet form, so that the cladding tube can be preloaded in tension.

Accordingly, the present invention is set forth in a fuel assembly for use at non-control rod locations of a nuclear reactor core. The fuel assembly includes top and bottom nozzles and a plurality of longitudinal structural members extending between and attached to the nozzles for forming the assembly into an integral unitary structure. At least certain of the structural members includes an elongated hollow cladding tube extending between the top and bottom nozzles and means secured to opposite ends of the tube for hermetically sealing the tube and attaching it to the top and bottom nozzles. The present invention relates to the improvement which comprises: (a) a quantity of irradiation-induced creep resistant material disposed within the tube; and (b) pretensioning means positioned within the tube for applying a predetermined compressive load to the creep resistant material therein and reacting the load so as to preload the tube in a state of pretension having a magnitude sufficient to substantially counteract an axial load typically transmitted through the unitary structure of the fuel assembly and thereby greatly reduce the compressive stress in the tube of the structural member.

More particularly, the creep resistant material is a ceramic material, such as zirc oxide, in pellet form. The ceramic pellets are coated with a burnable absorber material. Also, the pretensioning means can be either of two embodiments. In one embodiment, the pretensioning means is an elongated bellows type device positioned within the tube between the stack of creep resistant pellets and one of the tube ends. The interior of the bellows type device is pressurized to create a predetermined axial force therein which places the creep resistant pellets in compression and the tube in the state of pretension. Additionally, the remainder of the tube can be pressurized. In an alternative embodiment, the pretensioning means is an arrangement of belleville springs positioned within the tube between the stack of creep resistant pellets and one of the tube ends so as to create the predetermined axial force therein which places the creep resistant material in compression and the tube in the state of pretension. The belleville springs in the arrangement thereof are both stacked in parallel and in series.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged fragmentary view, in vertical section, of the fuel assembly of FIG. 1, showing one of its longitudinal structural members attached at opposite ends to the adapter plates of the top and bottom nozzles of the assembly and illustrating one embodiment of means for placing the structural member in pretension.

FIG. 3 is another enlarged fragmentary view, in vertical section, of the fuel assembly of FIG. 1 which is similar to the view of FIG. 2, but illustrates an alternative embodiment of means for placing the structural member in pretension.

FIG. 4 is a load-stress diagram comparing the longitudinal structural member design of the above cross-reference application with that of the present invention and demonstrating that the pretensioned member design of the present invention has much lower compressive stress for a given axial load than the non-pretensioned member design of the referenced application.

DETAILED DESCRIPTION OF THE INVENTION

Figure 1:
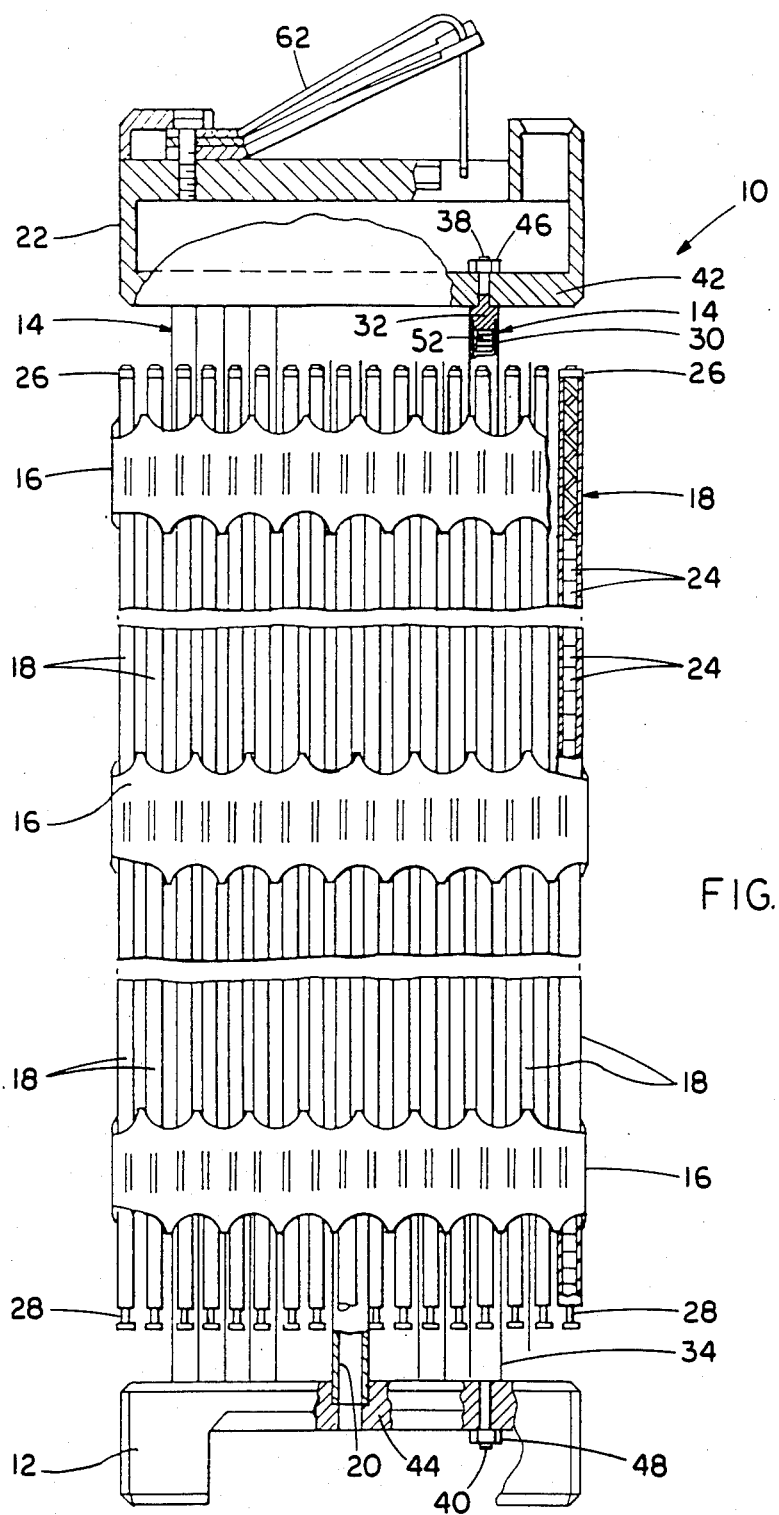
FIG. 1 is an elevational view, with parts broken away for clarity and partially in section, of a non-control rod fuel assembly including longitudinal structural members constructed in accordance with the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a fuel assembly adapted for use in non-control rod locations of a nuclear reactor core (not shown), represented in vertically foreshortened form and being generally designated by the numeral 10. Basically, the fuel assembly 10 includes a lower end structure or bottom nozzle 12 for supporting the assembly on the lower core plate (not shown) in the reactor core, and a number of longitudinally extending structural members 14 which at their lower ends are attached to and project upwardly from the bottom nozzle 12. The assembly 10 further includes a plurality of transverse grids 16 axially spaced along the structural members 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the structural members 14. With such arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced axially along the fuel assembly length. Each fuel rod 18 includes nuclear pellets 24 and is closed at its opposite ends by upper and lower end plugs 26,28. The fuel pellets composed of fissile material are responsible for creating the reactive power of the reactor. A liquid moderator-coolant such as water, or water containing boron, is pumped upwardly along the fuel rods 18 of the fuel assembly 10 in order to extract heat generated therein for the production of useful work.

Pretensioned Longitudinal Structural Members

Turning now to FIGS. 2 and 3, there is seen two slightly different embodiments of the longitudinal structural member 14 of the present invention either of which can be used in the fuel assembly 10. As indicated at the beginning, the fuel assembly 10 is designed to be used at non-control rod core locations so there are no control rods operatively associated with the assembly. In contradistinction to control rod guide thimbles in fuel assemblies at control rod core locations, which reciprocally receive control rods downwardly through their upper ends and also receive coolant flow upwardly through their lower ends, the longitudinal structural members 14 in the non-control rod fuel assembly 10 are sealed at their opposite ends.

Each embodiment of the longitudinal structural member 14, being depicted in FIGS. 2 and 3, includes an elongated hollow cladding tube 30 closed at each end by upper and lower end plugs 32,34 which are welded to the tube. The tube and end plug material is preferably Zircaloy-4. The upper and lower end plugs 32,34 have respective threaded studs 38,40 fixed thereto and extending axially therefrom which are inserted through openings in the respective adapter plates 42,44 of the top and bottom nozzles 22,12. Nuts 46,48 are tightened down on the threaded studs 38,40 for rigidly attaching the opposite ends of the structural member 14 to the respective nozzles 22,12. Typically, the tubes 30 of the structural members 14 have a substantially greater thickness than the tubes of control rod guide thimbles and there are substantially fewer structural members 14 in each non-control rod fuel assembly 10 than guide thimbles in each control rod fuel assembly. The remaining locations in the non-control rod fuel assembly 10 which correspond to those occupied by guide thimbles in the control rod fuel assembly are occupied by fuel rods 18. For example, there are typically twenty-four guide thimbles in the control rod fuel assembly, whereas in the non-control rod fuel assembly 10 there are only eight structural members 14 and so the sixteen remaining locations are occupied by additional fuel rods.

The improvement provided by the present invention in the structural members 14 herein over those disclosed in the above-referenced patent application relates to modifications made to the structural members 14 for making them resistant to bowing.

Each structural member 14 is made resistant to bowing by preloading its cladding tube 30 in pretension. To preload the tube 30 in tension, the central portion thereof must be loaded in compression. The material loaded in compression must not be subject to thermal or irradiation-induced creep or it will creep to a permanently bowed condition. Thus, the tube 30 of the member 14 contains a thermal or irradiation-induced creep resistant material 50, preferably being in pellet form and stacked in the tube 30. Ceramic materials, such as zirc oxide or alumina are typical examples of materials which are very creep resistant. They can also be coated with burnable absorber material, such as boron carbide, so they also fulfill the same function as that of the structural members of the referenced application.

For applying a compressive load to the ceramic pellets 50 and reacting the load in such a way as to load the tube 30 in pretension, either one of two embodiments of pretensioning means depicted in FIGS. 2 and 3 can be used.

In FIG. 2, the pretensioning means is a bellows type device, generally designated 52, being positioned in the tube 30 in the upper plenum region of the structural member 14. The bellows device 52 is connected, such as being welded, to the upper end plug 32. The outside diameter of the bellows device 52 is radially supported by the cladding tube 30 and the bottom end 54 of the device 52 presses against the stack of pellets 50. A pressurization passage 56 in the side of the upper end plug 32 allows pressurization of the inside of the bellows device 52. After pressurization the passage 56 is sealed and an axial force then exists in the bellows device 52 which puts the pellet stack 50 in compression and the tube 30 in pretension.

A bellows pressure of approximately 600 psi (cold) will provide an axial force of about 120 pounds during hot operating conditions. It should be noted that achievement of acceptable fuel assembly bow does not require zero axial stress so a lower pressure could be used. If desired, the inside of the member tube 30, in the pellet region, can be pressurized through a passage 58 in the lower end plug 34. It should be noted that if this is pressurized, it counteracts the pressure in the bellows so the bellows pressure must be increased accordingly.

Alternatively, as seen in FIG. 3, the pretensioning means is in the form of an arrangement of belleville springs 60. The belleville springs 60 can be stacked in parallel, as shown, to achieve higher spring rates and in series, as shown, to obtain greater deflection range.

Regardless of which embodiment of the pretensioning means is used, its function is to apply a predetermined compressive load to the creep resistant material 50 in the member 14 and react the load so as to preload the tube 30 in a state of pretension. The pretension should be of a magnitude sufficient to substantially counteract an axial load typically transmitted through the unitary structure of the fuel assembly 10 when installed in the reactor core and thereby greatly reduce the compressive stress in the tube 30 of the structural member 14. To some minimal extent, the coil spring as used heretofore applied a compressive load to the stack of absorber pellets. However, the magnitude of the force available from a coil spring which will fit inside the tube is far less than that required to produce any significant pretensioning of the tube. Thus, any pretensioning of the tube provided by the coil spring was incidental and inadequate. For example, a 17×17 fuel assembly has a hot BOL hold-down spring force of approximately 953 pounds. Since there are eight structural members 14, each member carries approximately 120 pounds. To obtain a stress free cladding tube during operation, a tension preload of 120 pounds per structural member 14 is required. This is much higher than can be achieved by a coil spring which will fit inside of the tube.

In view of the present invention, when the core plate compressive forces are applied to the hold-down springs 62 of the fuel assembly 10, the axial compressive stresses on the cladding tubes 30 of the structural members 14 are greatly reduced. This is shown in FIG. 4 which is a load-stress diagram showing the structural member design of the cross-referenced application compared to the structural member design of the present invention. (All cladding and dimensional parameters are the same in both cases.) The diagram shows that the pretensioned tube of the structural member of the present invention has a much lower compressive stress for a given axial load than that of the prior non-pretensioned tube of the referenced application.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a fuel assembly for use at non-control rod locations of a nuclear reactor core, said fuel assembly including top and bottom nozzles and a plurality of longitudinal structural members extending between and attached to said nozzles for forming said assembly into an integral unitary structure, at least certain of said structural members including an elongated hollow cladding tube extending between said top and bottom nozzles and means secured to opposite ends of said tube for hermetically sealing said tube and attaching it to said top and bottom nozzles, the improvement which comprises:
   (a) a quantity of irradiation-induced creep resistant material disposed within said tube; and
   (b) pretensioning means positioned within said tube for applying a predetermined axially-directed compressive load to said creep resistant material therein and reacting said load so as to axially preload said tube in a state of pretension having a magnitude sufficient to substantially counteract an axial load typically transmitted through said unitary structure of said fuel assembly and thereby greatly reduce the compressive stress in said tube of said structural member.

2. The longitudinal structural member as recited in claim 1, wherein said creep-resistant material is a ceramic material in pellet form.

3. The longitudinal structural member as recited in claim 2, wherein said ceramic material is zirc oxide.

4. The longitudinal structural member as recited in claim 2, wherein said ceramic material is coated with a burnable absorber material.

5. The longitudinal structural member as recited in claim 1, wherein said pretensioning means is an elongated bellows type device positioned within said tube between said creep resistant material and one of said tube ends, said interior of said bellows type device being pressurized to create a predetermined axial force therein which places said creep resistant material in compression and said tube in said state of pretension.

6. The longitudinal structural member as recited in claim 5, wherein said pretensioning means further includes pressurization of the remainder of said tube.

7. The longitudinal structural member as recited in claim 1, wherein said pretensioning means is an arrangement of belleville springs positioned within said tube between said creep resistant material and one of said tube ends so as to create a predetermined axial force therein which places said creep resistant material in compression and said tube in said state of pretension.

8. The longitudinal structural member as recited in claim 7, wherein said belleville springs in said arrangement thereof are both stacked in parallel and in series.

9. In a fuel assembly for use at non-control rod locations of a nuclear reactor core, said fuel assembly including top and bottom nozzles and a plurality of longitudinal structural members extending between and attached to said nozzles for forming said assembly into an integral unitary structure, at least certain of said structural members comprising:
   (a) an elongated hollow cladding tube extending between said top and bottom nozzles;
   (b) means secured to opposite ends of said tube for hermetically sealing said tube and attaching it to said top and bottom nozzles;
   (c) a quantity of irradiation-induced creep resistant material disposed within said tube, said creep-resistant material being a ceramic material in pellet form and coated with a burnable absorber material; and
   (d) pretensioning means positioned within said tube for applying a predetermined axially-directed compressive load to said creep resistant ceramic pellet stack therein and reacting said load so as to axially preload said tube in a state of pretension having a magnitude sufficient to substantially counteract an axial load typically transmitted through said unitary structure of said fuel assembly and thereby greatly reduce the compressive stress in said tube of said structural member.

10. The longitudinal structural member as recited in claim 9, wherein said pretensioning means is an elongated bellows type device positioned within said tube between said creep resistant ceramic pellet stack and one of said tube ends, said interior of said bellows type device being pressurized to create a predetermined axial force therein which places said creep resistant ceramic pellet stack in compression and said tube in said state of pretension.

11. The longitudinal structural member as recited in claim 10, wherein said pretensioning means further includes pressurization of the remainder of said tube.

12. The longitudinal structural member as recited in claim 9, wherein said pretensioning means is an arrangement of belleville springs positioned within said tube between said creep resistant ceramic pellet stack and one of said tube ends so as to create a predetermined axial force therein which places said creep resistant ceramic pellet stack in compression and said tube in said state of pretension.

13. The longitudinal structural member as recited in claim 12, wherein said belleville springs in said arrangement thereof are both stacked in parallel and in series.

* * * * *